June 25, 1935.  K. W. CONNOR  2,006,158
METHOD OF MACHINING CYLINDERS
Filed Sept. 23, 1933  2 Sheets-Sheet 1
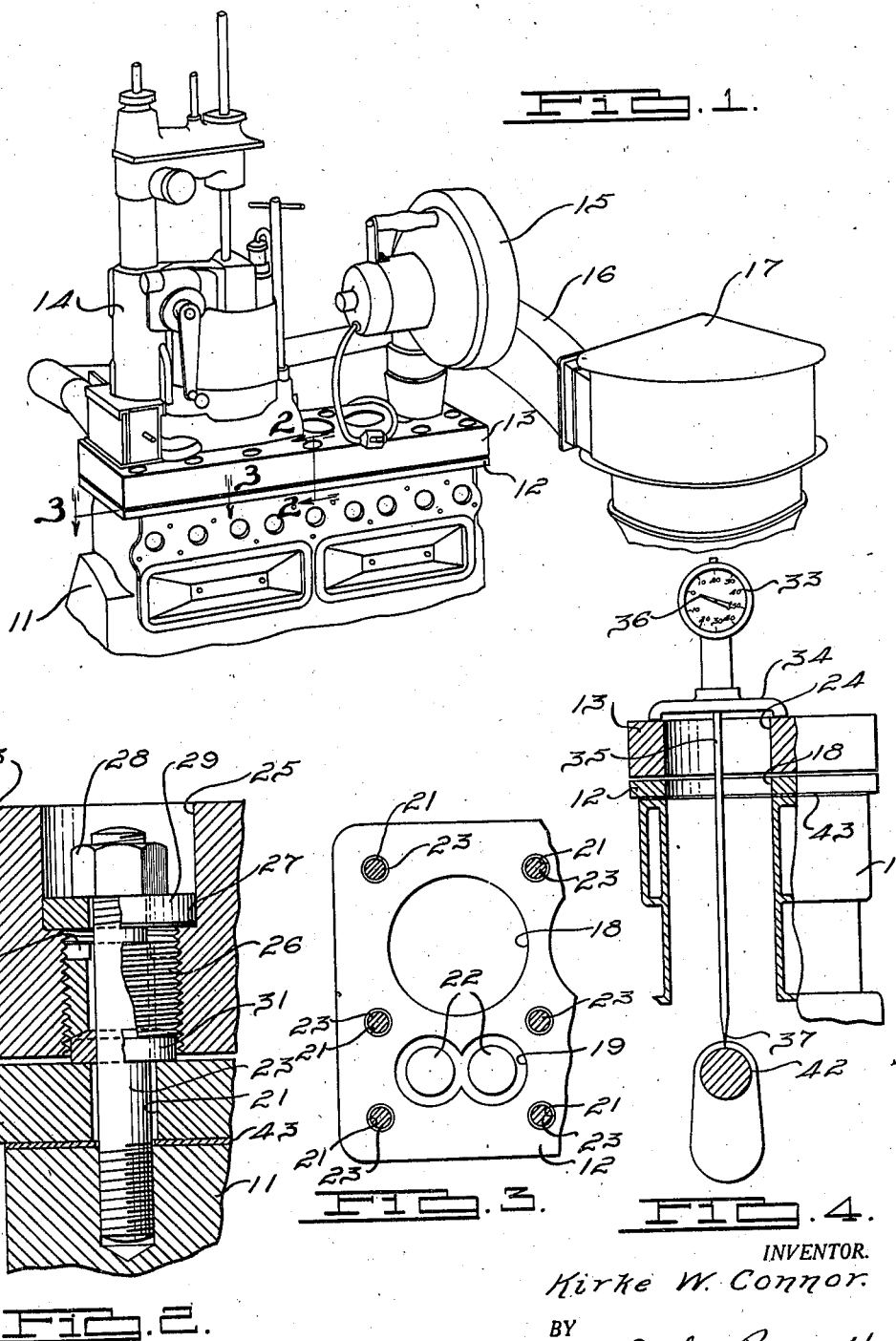
INVENTOR.
Kirke W. Connor.
BY
Harness, Dickey, Pierce & Hann.
ATTORNEYS.

June 25, 1935. K. W. CONNOR 2,006,158
METHOD OF MACHINING CYLINDERS
Filed Sept. 23, 1933 2 Sheets-Sheet 2
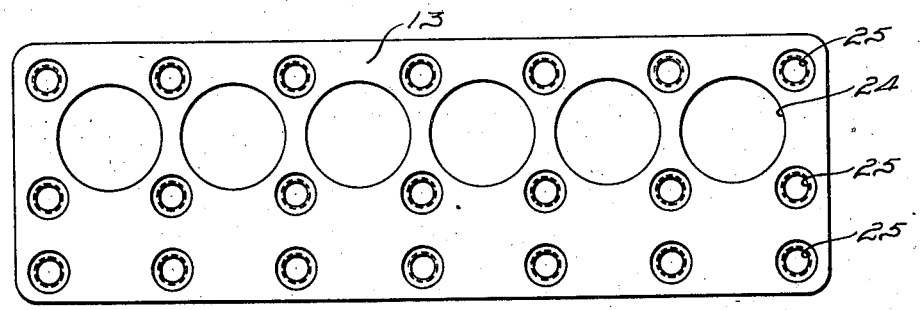
FIG. 5.
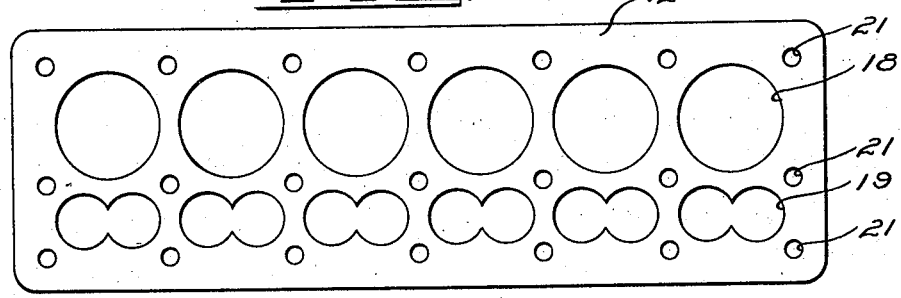
FIG. 6.
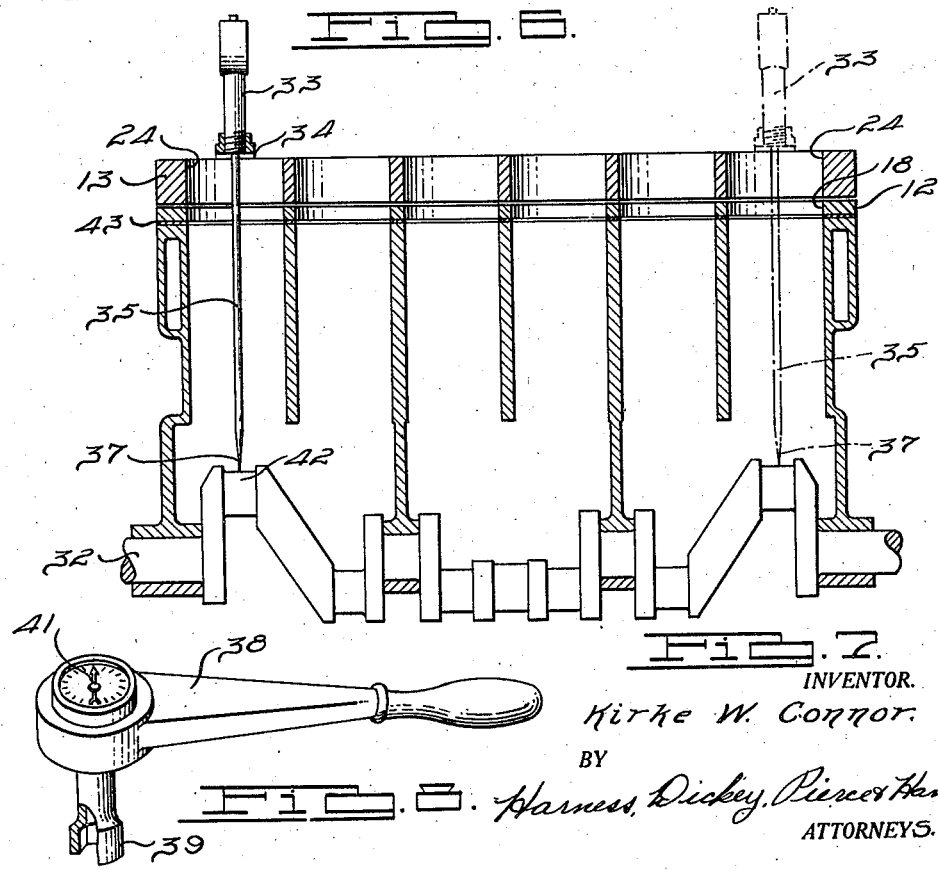
FIG. 7.
FIG. 8.
INVENTOR.
Kirke W. Connor.
BY
Harness, Dickey, Pierce & Hann.
ATTORNEYS.

Patented June 25, 1935

2,006,158

UNITED STATES PATENT OFFICE 2,006,158

METHOD OF MACHINING CYLINDERS

Kirke W. Connor, Detroit, Mich., assignor to Micromatic Hone Corporation, a corporation of Michigan Application September 23, 1933, Serial No. 690,673

14 Claims. (Cl. 51—278)

This invention relates to a method of machining automobile cylinders or the like and in particular to a method of correctly positioning the cylinder boring or grinding tool and of reproducing, during the machining of the cylinders, stresses in the cylinder block substantially identical with those caused by a properly secured cylinder head.

In the manufacture of internal combustion engines the cylinder holes in the cylinder block are usually machined from the bottom with the axis of the crank shaft as a reference line. It has been common practice to rebore the cylinder holes when the same have become worn. This reboring has been done by removing the cylinder head and, working downward from the top of the cylinder block, enlarging the hole to a true cylindrical form. The axis of the new cylindrical hole is, according to the method used, either the axis of a grinding tool working freely in a non-cylindrical hole or an axis normal to the top surface of the cylinder block. This new axis may or may not coincide with the original axis of the cylinder which was determined with reference to the crank shaft axis and in particular it may be tilted longitudinally to the cylinder block. Furthermore, the remounting of the cylinder head and the subsequent tightening of the stud bolts may introduce stresses in the cylinder block sufficient to deform the newly ground or bored cylindrical hole to a non-cylindrical form.

It is, accordingly, an object of this invention to provide a method of machining cylinders of internal combustion engines or the like so that the axis of each machined cylinder is perpendicular to the axis of the crank shaft.

Another object of the invention is to provide a method of machining cylinders of internal combustion engines or the like so that each cylinder is of true cylindrical form when the cylinder block is subjected to the stresses resulting from the bolting of a cylinder head thereon.

Another object is to provide a method of determining the correct position of a machining tool above a cylinder block by reference to the crank shaft axis of the cylinder block.

Another object is to provide a method of subjecting a cylinder head during the machining operation thereof to the same stress to which the head is subjected under operating conditions.

With these and other objects in view the invention will be better understood from the following description with reference to the illustrative embodiment of the invention shown in the accompanying drawings which form part of the specification, in which:

Fig. 1 is a view in perspective showing the cylinder block of an internal combustion engine together with the spacer plate, the reboring machine supporting plate and reboring apparatus mounted thereon in operative relation.

Fig. 2 is a fragmentary transverse vertical sectional view on enlarged scale taken along the line 2—2 of Fig. 1, looking in the direction indicated by the arrows, showing in detail the means for adjusting and securing the spacer plate and the reboring machine supporting plate.

Fig. 3 is a fragmentary plan view on enlarged scale of the cylinder block taken along the line 3—3 of Fig. 1 looking in the direction indicated by the arrows.

Fig. 4 is a fragmentary vertical transverse sectional view of a portion of the cylinder block, spacer plate and reboring machine supporting plate showing the use of an indicator by means of which the distance from the top of the reboring machine supporting plate to the crank shaft is measured.

Fig. 5 is a plan view of the reboring machine supporting plate.

Fig. 6 is a plan view of the spacer plate.

Fig. 7 is a vertical longitudinal sectional view of the cylinder block, spacer plate and reboring machine supporting plate showing the use of an indicator for determining the parallelism between the top of the reboring machine supporting element and the crank shaft axis of the cylinder block.

Fig. 8 is a view in perspective of the wrench used in securing the machine supporting plate to the cylinder block showing the gauge whereby uniform and predetermined upward forces may be applied to the stud bolts of the cylinder block.

Referring to Fig. 1, a cylinder block 11 is shown with the cylinder head and manifolding removed. On the top face of the cylinder block 11, that is, the face on which the cylinder head normally rests, a spacer or stressing plate 12 and a reboring machine supporting plate 13 are fixedly mounted in superimposed substantially parallel relation. The plate 13 supports a grinding or boring machine 14 for reboring the cylinder walls and a blower 15 for forcing air into the cylinder head and upward through the cylinder being ground for the purpose of carrying the grinding residue or boring chips up from the cylinder and through the conduit 16 into the dust collector 17. The construction and operation of the grinding or boring machine 14, blower 15 and dust collector 17 are disclosed in the inventor's copending application Serial No. 664,225, filed April 3, 1933, and forms no part of the present invention which relates more specifically to the construction and method of using the spacer plate 12 and reboring machine supporting plate 13.

As best shown in Figs. 5 and 6, the spacer plate 12 and the machine supporting plate 13 are relatively flat plates of rectangular shape approximating the top face of the cylinder block 11 which is to be machined. The plate 12, in order that it may lie flush against the top face of the cylinder head 11, is provided with oval shaped valve holes 19 to accommodate the portions of the valves 22 which project upwardly from the cylinder block 11, and with stud bolt holes 21 through which may project the stud bolts 23 in the cylinder block 11. The number and position of the valve holes 19 and stud bolt holes 21 is determined in accordance with the type and size of cylinder block 11 to be machined. The plate 12 is provided with, in addition to the aforementioned apertures, a plurality of circular holes 18 one for each cylinder and positioned to afford access to the cylinders of the cylinder block 11.

As shown in Fig. 5, the machine supporting plate 13 is similarly provided with a number of cylinder holes 24 and stud bolt holes 25. No corresponding holes are provided for the valves 22 inasmuch as these will not project upward beyond the spacer plate 12. As is best shown in Fig. 2, the lower part of each of the stud bolt holes 25 in the plate 13 is threaded to receive a short exteriorly threaded sleeve 26 while the upper part is enlarged to have a diameter somewhat greater than the diameter of the threaded part, the juncture between the two parts of the hole 25 forming the annular shoulder 27.

By referring to Figs. 1, 2, 3, 5 and 6 it will be seen that the spacer plate 12 may be placed on the top face of the cylinder block 11 with the stud bolts 23 thereof projecting through the holes 21. The machine supporting plate 13 which is apertured similarly to plate 12 may be placed above the plate 12 with the ends of the stud bolts 23 projecting upwardly into the holes 25.

Means are provided to adjustably space the machine supporting plate 13 from the spacer plate 12 and cylinder block 11 and comprise, as shown in Fig. 2, the aforementioned threaded sleeves 26 each of which encircles a stud bolt 23 and engages the lower or threaded portion of one of the holes 25. Washers 31 each encircling a stud bolt 23 provide a bearing between the sleeves 26 and the spacer plate 12. The top surfaces of the washers 31 and the bottom surfaces of the sleeves 26 are respectively convexly and concavely spherical so as to allow for an angular displacement of one relative to the other. By reason of the threaded engagement of the sleeves 26 with the plate 13 a turning of a sleeve 26 will result in a displacement of the plate 13 relative to the corresponding washer 31 and the plate 12. The top surfaces of the sleeves 26 are provided with radial slots 30 at diametrically opposite sides to receive a spanner wrench or like means for imparting rotation thereto.

As is best shown in Fig. 2, the machine supporting plate 13 is secured to the cylinder block 11 by means of the stud bolts 23 which project upwardly through the holes 21 in the spacer plate 12 and into the holes 25 in the machine supporting plate 13. Washers 29 each encircling a stud bolt 23 and engaging one of the annular shoulders 27 of the plate 13 serve, in conjunction with the nuts 28 which are screwed down on the ends of the stud bolts 23, to secure the plates 13 and 12 to the cylinder block 11.

Means are provided for measuring the distance between the top face of the plate 13 and the axis of the crank shaft 32 and comprise an indicator 33 provided with a support 34 adapted to span any of the cylinder holes 24 in the plate 13. The indicator 33 is provided centrally with an axially slidable rod 35 the upper end of which is operatively connected to the indicator hand 36 of the indicator 33 so as to cause the same to indicate the vertical distance between the support 34 and the lower end 37 of the rod 35.

In order that the nuts 28 may be screwed down on the stud bolts 23 a uniform and predetermined amount, a special type of wrench 38 is provided. As shown in Fig. 8, the wrench 38 is provided with a head 39 complementary to the nuts 28 and an indicator 41 which shows the torque applied on the handle of the wrench.

The method of using the aforementioned structures is as follows: The cylinder head, oil pan, connecting rods and pistons of the engine to be rebored are first removed. A spacer plate 12, chosen in accordance with the size and type of engine, is placed on top of the cylinder block 11 with the stud bolts 23 of the cylinder block 11 projecting through the holes 21 in the spacer plate 12. A washer 31 is then placed around each stud bolt 23 with the spherical surface of the washer 31 facing up. Sleeves 26 are then screwed in the threaded portion of each of the holes 25 of a machine supporting plate 13 of a type corresponding to the spacer plate 12 and the cylinder block 11 which is to be machined. Plate 13 is then placed in position on top of the spacer plate 12 so that the sleeves 26 bear against the washers 31, the stud bolts 23 extending through the sleeves 26 and into the upper or cylindrical portions of the holes 25.

As shown in Fig. 7 the crank shaft 32 is then rotated until the crank 42 corresponding to cylinder No. 1 is at the highest point of its stroke. The indicator 33 is then placed on top of the plate 13 so that the support 34 thereof spans the hole 24 corresponding to cylinder No. 1 and so that the rod 35 extends down centrally through cylinder No. 1 and rests against the uppermost part of crank 42. The indicator hand 36 will then give a reading corresponding to the distance between the top surface of plate 13 at its forward end and the crank 42 in its topmost position. As shown in dotted outline the indicator 33 is then placed over the hole 24, corresponding to cylinder No. 6, at the other end of the plate 13 and the distance between the top surface at the other end of plate 13 and the corresponding crank in its topmost position is similarly measured.

Assuming, as is generally the case, that all the cranks of the crank shaft 32 have equal throws, if the two readings of the indicator 33 are not identical, the top face of plate 13 is not parallel to the axis of the crank shaft 32. By rotating one or two of the sleeves 26 at the lowermost end of the machine supporting plate 13, that end is raised the desired amount and the entire plate 13 brought in parallel relation with the axis of the crank shaft 32. This parallelism may be checked by repeating the operation of measuring the distance between each end of the plate 13 and the axis of the crank shaft so as to make sure that the two indicator readings are the same.

At this stage the plate 13 is supported on the spacer plate 12 by two or more of the sleeves 26 and the washers 31, the other sleeves 26 not being turned down sufficiently to contact with the washers 31. It is preferable that the weight of the plate 13 be borne equally by all of the sleeves 26. Those sleeves 26 which bear no weight can be readily ascertained by their loose engagement with the threaded part of the cylindrical hole 24, and can be quickly turned down until the operator feels that they bear against the washers 31.

No specific means have been provided for determining the angular position of the plate 13 in a transverse direction. It is contemplated that the operator will do so by visual means, referring, if necessary, to the top edges of the cylinder block. Although the transverse angular positioning will be less accurate than the longitudinal it will nevertheless be sufficiently accurate for grinding purposes for the following reason. It is essential that the axis of each cylinder be in a plane perpendicular to the axis of the crank shaft, otherwise undue wear will occur at the front and rear part of the cylinder wall. However, the axis of the cylinder, if it is in that plane, may project somewhat to one side or the other of the crank shaft without resulting in any appreciable harm inasmuch as the piston operating in that cylinder is free to move along any line in that plane by reason of the bearings at either end of the connecting rod which have their axis perpendicular to that plane.

With the plates 12 and 13 correctly positioned on the cylinder block 11 and the sleeves 26 turned so that each is in contact with its respective washer 31, the plate 13 is ready to be securely fastened to the cylinder block 11 as follows. A washer 29 is placed in each hole 25 of the plate 13 so that it encircles the corresponding stud bolt 23 and rests on the corresponding shoulder 27. A nut 28 is screwed down tightly on each stud bolt 23 until it bears against its respective washer 29. The nuts 28 may be screwed down to uniform and predetermined amounts by the use of the aforementioned wrench 38, which indicates the torque applied to the nut 28 as it is screwed down.

With the plate 13 secured to the cylinder block 11 by uniform tightening of all the nuts 28, the cylinder block 11 is subjected to substantially the same stresses that would obtain if a cylinder head were properly attached. These stresses are sufficient to cause substantial deformation of the cylinder block 11 and, unless the cylinder block 11 is ground while in this deformed condition, the cylindrical surfaces will no longer obtain when the cylinder head is replaced. In order to more closely reproduce these stresses it is preferable that the cylinder head gasket 43 remain on the top of the cylinder block 11 and spacer plate 12 be placed on the gasket 43, as shown in Fig. 2, rather than directly on the cylinder block 11.

The cylinder block 11 is now ready to be rebored. This may be done with the apparatus shown in Fig. 1 and fully described in the above mentioned copending application to which reference is herein made, or it may be done with other apparatus old in the art. Suitable means may be provided for securing the apparatus to the plate 13 or it may be held manually or by its own weight.

In the drawings the invention is illustrated in connection with a conventional six cylinder engine. However, other sets of spacer plates 12 and machine supporting plates 13 may be desired for use in connection with engines of other types differing in size or in the number of cylinders, or, spacer plates 12 and machine supporting plates 13 may be designed which may be used interchangeably on different types of engines.

The invention has herein been described in connection with the boring of cylinder blocks, but the use of a plate such as plates 12 or 13 for reproducing, for the duration of any machining operation, the stresses caused by a cylinder head, is equally within the purview of the invention.

Formal changes may be made in the specific embodiment of the invention described without departing from the spirit and substance of the broad invention, the scope of which is commensurate with the appended claims.

I claim as my invention:

1. The method of machining internal combustion engine cylinders or the like including the steps of mounting a spacer element on the cylinder block in the position usually occupied by the cylinder head, mounting a machine supporting element above said spacer element, rigidly spacing said machine supporting element from said cylinder block so that the ends of said machine supporting element are equidistant from the crank shaft axis of said cylinder block, and then threading elements on the stud bolts of said cylinder block which urge said machine supporting element toward said cylinder block.

2. The method of machining internal combustion engine cylinders or the like including the steps of mounting a spacer element on the cylinder block in the position usually occupied by the cylinder head, mounting a machine supporting element above said spacer element, rigidly spacing said machine supporting element from said cylinder block so that the ends of said machine supporting element are equidistant from the crank shaft axis of said cylinder block, threading elements on the stud bolts of said cylinder block which urge said machine supporting element toward said cylinder block, and then tightening said threaded elements by a torque indicating tool.

3. A device for supporting a machining tool on the cylinder block of an internal combustion engine or the like including a machine supporting plate which exposes the cylinder holes of said block, adjustable means for rigidly positioning said machine supporting plate in parallel relation to the crank shaft axis of said cylinder block, and means for securing said machine supporting plate to said cylinder block.

4. A device for supporting a machining tool of the cylinder block of an internal combustion engine or the like including a machine supporting plate which exposes the cylinder holes of said block, adjustable means for rigidly positioning said machine supporting plate in parallel relation to the crank shaft axis of said cylinder block, and means for pressing said machine supporting plate toward said cylinder block at points adjacent the stud bolt holes of said cylinder block.

5. A device for supporting a machining tool of the cylinder block of an internal combustion engine or the like including a spacer plate adapted to lie in the top face of the cylinder block and expose the cylinder holes of the cylinder block, means for drawing said spacer plate against said cylinder block at points adjacent the stud bolt holes of said cylinder block, a machine supporting plate adapted to lie on said spacer plate and also exposing the cylinder holes of said block, and means for securing said machine supporting plate to said cylinder block.

6. A device for supporting a machining tool in the cylinder block of an internal combustion engine or the like including a spacer plate adapted to lie on the top face of the cylinder block and expose the cylinder holes of said block, a machine supporting plate adapted to lie on said spacer plate and also exposing the cylinder holes of said block, adjustable means for rigidly positioning said machine supporting plate in parallel relation to the crank shaft axis of said cylinder block, and means for securing said spacer plate and said machine supporting plate to said cylinder block.

7. A device for supporting a machining tool on the cylinder block of an internal combustion engine or the like including a spacer plate adapted to lie on the top face of the cylinder block and also exposing the cylinder holes of said block, means for drawing said spacer plate against said cylinder block at points adjacent the stud bolt holes of said cylinder block, a machine supporting plate adapted to lie on said spacer plate and having holes aligned with the holes of said cylinder block, adjustable means for rigidly positioning said machine supporting plate in parallel relation to the crank shaft axis of said cylinder block, and means for securing said machine supporting plate to said cylinder block.

8. The method of machining a cylinder block or the like, including the steps, of mounting a stressing plate on the block in the position occupied by a cylinder head, of drawing said plate on said block to stress the block to simulate the stressed condition effected when said head is drawn thereon, and machining said cylinders while so stressed.

9. The method of machining a cylinder block or the like, including the steps, of mounting a stressing plate on the cylinder block, of stressing said block by said plate to simulate the stressed condition effected when a cylinder head is clamped thereon, and machining said cylinder while so stressed.

10. The method of machining a cylinder block or the like, including the steps, of mounting a stressing plate on the cylinder block in the position usually occupied by the cylinder head, of mounting a leveling plate upon said stressing plate, of leveling said plate relative to the axis of the crank shaft bearing, of securing said plates to the block to stress the block to simulate the stress effected therein when a cylinder head is attached thereto, and machining said cylinders while so stressed.

11. The method of machining internal combustion engine cylinder blocks or the like, including the steps, of mounting a stressing plate on the cylinder block in the position usually occupied by the cylinder head, of mounting a leveling plate on top of the stressing plate, of leveling said plate relative to the axis of the crank shaft bearing, of mounting a machine tool on top of the leveling plate, of securing said leveling plate and stressing plate to the block to stress the block to simulate the stresses effected therein when a cylinder head is clamped thereon, and of machining said cylinders while the machine tool is so leveled and the block so stressed.

12. The method of machining an internal combustion engine cylinder block or the like, including the steps, of mounting a stressing plate on the cylinder block, of mounting a gasket between said plate and block, of clamping said plate and gasket to the block to stress the block to simulate the stressed condition effected when a cylinder head is attached thereto, and machining the cylinder when so stressed.

13. The method of machining an internal combustion engine cylinder block or the like, including the steps, of mounting a stressing plate on the cylinder block to have the cylinder exposed for a machine operation, of mounting a gasket between said plate and block, of clamping said plate and gasket to the block to stress the block to simulate the stressed condition effected when a cylinder head is attached thereto, and machining the cylinder when so stressed.

14. The method of machining a cylinder block or the like, including the steps, of mounting a stressing plate on the cylinder block in the position usually occupied by the cylinder head, of mounting a gasket between said plate and block, of mounting a leveling plate upon said stressing plate, of leveling said plate relative to the axis of the crank shaft bearing, of securing said plates and gasket to the block to stress the block to simulate the stress effected therein when a cylinder head is attached thereto, and machining said cylinders while so stressed.

KIRKE W. CONNOR.

CERTIFICATE OF CORRECTION.

Patent No. 2,006,158.  June 25, 1935.

KIRKE W. CONNOR.

It is hereby certified that error appears in the printed specification of the above numbered patent requiring correction as follows: Page 4, first column, line 21, claim 7, for "also exposing" read expose; and line 26, for "having holes aligned with" read also exposing; and that the said Letters Patent should be read with these corrections therein that the same may conform to the record of the case in the Patent Office.

Signed and sealed this 13th day of August, A. D. 1935.

Leslie Frazer
Acting Commissioner of Patents.

(Seal)